US009381581B1

(12) United States Patent
Zaman et al.

(10) Patent No.: US 9,381,581 B1
(45) Date of Patent: Jul. 5, 2016

(54) END MILL

(71) Applicant: The Boeing Company, Chicago, IL (US)

(72) Inventors: Abu Muhammed A. Zaman, Renton, WA (US); Sidlaghatta N. Venkatesh, Renton, WA (US); John E. Furber, Orting, WA (US); Ernest Linn, Renton, WA (US); Robert D. Hughes, Bonney Lake, WA (US); Larry G. Falk, Auburn, WA (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 13/778,342

(22) Filed: Feb. 27, 2013

(51) Int. Cl.
*B23C 5/10* (2006.01)

(52) U.S. Cl.
CPC .............. *B23C 5/10* (2013.01); *Y10T 407/1946* (2015.01); *Y10T 407/1948* (2015.01); *Y10T 407/1962* (2015.01)

(58) Field of Classification Search
CPC   B23B 51/02; B23B 2251/14; B23B 2251/18; B23B 2251/28; Y10T 407/1946; Y10T 407/1948; Y10T 407/1962; Y10T 407/1964; Y10T 407/1966; Y10T 408/9097; Y10T 408/909; Y10T 408/9095
USPC ........... 408/230, 207, 229; 407/53, 54, 61–63
See application file for complete search history.

(56) References Cited

U.S. PATENT DOCUMENTS

| 5,094,573 | A | * | 3/1992 | Hougen | ............... B23B 51/0406 407/53 |
| 5,213,452 | A | * | 5/1993 | Kirby | ..................... B23C 5/1081 407/118 |
| 5,855,458 | A | * | 1/1999 | Reynolds | ................ B23B 51/02 407/34 |
| 6,997,651 | B2 | | 2/2006 | Kawai et al. | |
| 7,402,004 | B2 | * | 7/2008 | Tanaka | ...................... B23C 5/10 407/53 |
| 2006/0045639 | A1 | * | 3/2006 | Flynn | ........................ B23C 5/10 407/54 |
| 2009/0060663 | A1 | * | 3/2009 | Rouge | ....................... B23C 5/10 407/44 |

FOREIGN PATENT DOCUMENTS

| GB | 2186220 A | * | 8/1987 |
| JP | 04159010 A | * | 6/1992 |
| JP | 06218616 A | * | 8/1994 |
| JP | 2000000716 A | * | 1/2000 |

(Continued)

OTHER PUBLICATIONS

Machine Translation of JP 2002-292515, Sep. 11, 2015, pp. 4-9.*

(Continued)

*Primary Examiner* — Daniel Howell
*Assistant Examiner* — Nicole N Ramos
(74) *Attorney, Agent, or Firm* — Walters & Wasylyna LLC

(57) ABSTRACT

An end mill may include a body elongated along an axis of rotation, the body may include a shank end and a cutting end opposite the shank end, the cutting end having a cutting diameter and defining a pair of helical flutes that form a first helical cutting tooth and a second helical cutting tooth, wherein each of the first cutting tooth and the second cutting tooth includes a peripheral cutting edge, an end cutting edge, a chamfer cutting edge extending from the peripheral cutting edge to the end cutting edge, and a rake face at least partially bounded by the end cutting edge and the chamfer cutting edge.

20 Claims, 17 Drawing Sheets

(56) References Cited

FOREIGN PATENT DOCUMENTS

| | | | | |
|---|---|---|---|---|
| JP | 2000210808 | A | * | 8/2000 |
| JP | 2002292515 | A | * | 10/2002 |
| JP | 2004141975 | A | * | 5/2004 |

OTHER PUBLICATIONS

National Aerospace Standard 986, *Aerospace Industries Association* (2001).

* cited by examiner

END MILL

FIELD

The present disclosure is generally related to cutting tools and, more particularly, to end mills.

BACKGROUND

An end mill is a type of milling cutter—a cutting tool used in industrial milling applications. End mills can generally cut in all directions and are used in various applications, such as profile milling, tracer milling, face milling, and plunging.

End mills are expensive to manufacture and, accordingly, various techniques to improve their durability are utilized. For example, to reduce wear of the tool and compliant surface roughness, radiused cutting edges may be provided thereon. While this configuration increases the serviceable life of the cutter, a large radius may cause undesirable vibration during the milling process, producing objectionable noise in the vicinity of a milling machine. Excessive vibration of the end mill may also lead to poor quality of the processed surfaces and a reduction in the service life of the tool.

SUMMARY

An improved end mill is provided according to one or more aspects of the present disclosure.

In one example, the disclosed end mill may include a body elongated along an axis of rotation, the body including a shank end and a cutting end opposite the shank end. The cutting end may have a cutting diameter and may define a pair of helical flutes that form a first helical cutting tooth and a second helical cutting tooth. The first cutting tooth may include a first peripheral cutting edge, a first end cutting edge, a first chamfer cutting edge extending from the first peripheral cutting edge to the first end cutting edge, and a first rake face bounded by the first end cutting edge and the first chamfer cutting edge. The second cutting tooth may include a second peripheral cutting edge, a second end cutting edge, a second chamfer cutting edge extending from the second peripheral cutting edge to the second end cutting edge, and a second rake face at least partially bounded by the second end cutting edge and the second chamfer cutting edge.

Other aspects of the disclosed end mill will become apparent from the following detailed description, the accompanying drawings and the appended claims.

DETAILED DESCRIPTION

Figure 1:
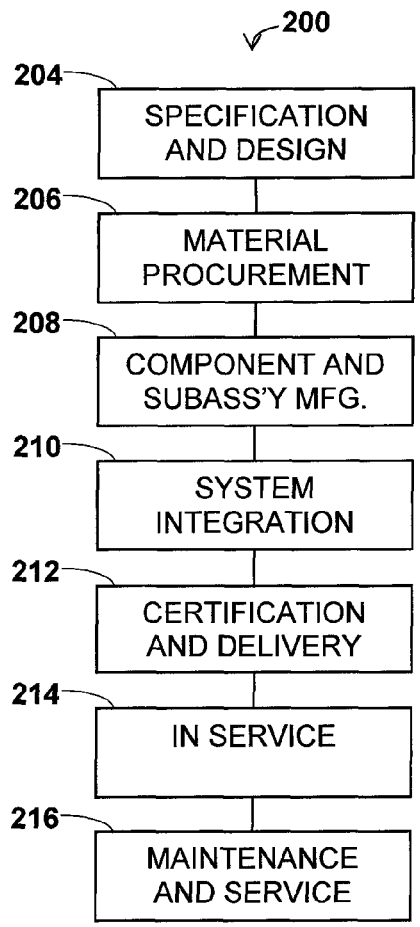
FIG. 1 is a flow diagram of aircraft production and service methodology.

The following detailed description refers to the accompanying drawings, which illustrate specific aspects of the disclosure. Other aspects having different structures, features and operations do not depart from the scope of the present disclosure. Like reference numerals may refer to the same element or component in the different drawings.

Figure 2:
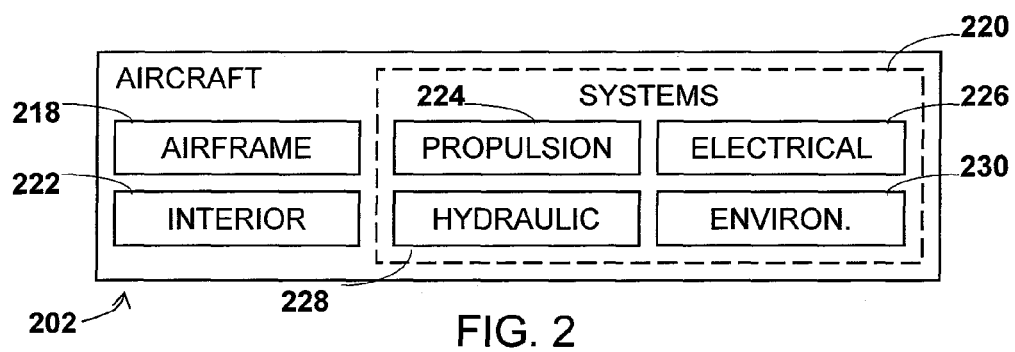
FIG. 2 is a block diagram of an aircraft.

Referring more particularly to the drawings, aspects of the disclosure may be described in the context of an aircraft manufacturing and service method 200 as shown in FIG. 1 and an aircraft 202 as shown in FIG. 2. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus aspects, method aspects, or a combination thereof may be utilized during the production stages 208 and 210, for example, by substantially expediting assembly of or reducing the cost of an aircraft 202. Similarly, one or more of apparatus aspects, method aspects, or a combination thereof may be utilized while the aircraft 202 is in service, for example and without limitation, to maintenance and service 216.

Figure 3:
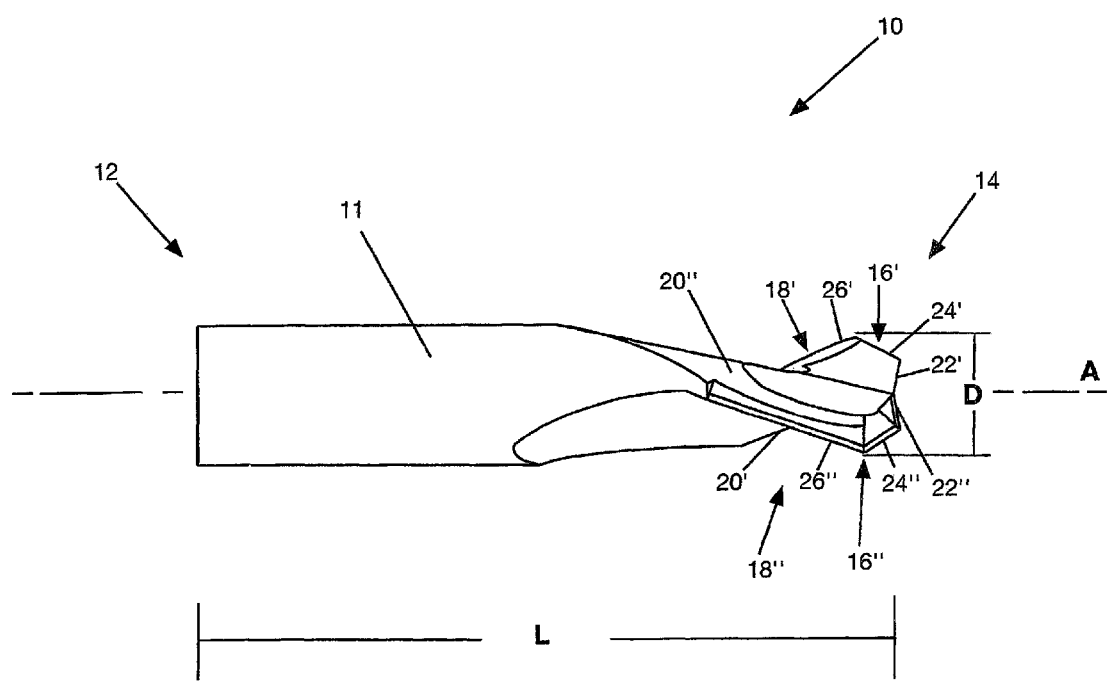
FIG. 3 is side elevational view of one example of the disclosed end mill.

Referring to FIG. 3, one aspect of the disclosed end mill, generally designated 10, may include a body 11 elongated along an axis of rotation A. The body 11 may be fabricated from a cylindrical blank of hard and tough material, for example high-speed steel, cobalt steel, tungsten carbide, or the like. The body 11 may have a length L. In one implementation, the length L of the body 11 may be between about 2 and about 3 inches. In another implementation, the length L of the body 11 may be between about 2 and about 5 inches. In another implementation, the length L of the body 11 may be between greater than about 5 inches. The body 11 may include a shank end 12 and a cutting end 14 longitudinally opposed from the shank end 12. The cutting end 14 may include a cutting diameter D. In one implementation, the cutting diameter D may be between about 0.250 and about 2 inches. In another implementation, the cutting diameter D may be between about 0.3 and about 1 inch. In another implementation, the cutting diameter D may be between about 0.375 and about 0.5 inch.

The cutting end 14 may be defined by a first flute 18' and a second flute 18" circumferentially and equidistantly spaced around the body 11. The first helical flute 18' may form a first cutting tooth 16'. The second helical flute 18" may form a second cutting tooth 16". The flutes 18', 18" may define a space between the cutting teeth 16', 16" to provide chip space and regrinding capabilities to the end mill 10. The first cutting tooth 16' and the second cutting tooth 16" may be equiangularly spaced apart from each other at an angular interval of 180°.

The first cutting tooth 16' may include a first helical surface 20', a first peripheral cutting edge 26', a first end cutting edge 22', and a first chamfer cutting edge 24'. The second cutting tooth 16" may include a second helical surface 20", a second peripheral cutting edge 26", a second end cutting edge 22", and a second chamfer cutting edge 24". The end cutting edges 22', 22", the chamfer cutting edges 24', 24", and the peripheral cutting edges 26', 26" may be alternately arranged when viewed from the cutting end 14 along the axis of rotation A. The longitudinal length of the cutting end 14 may be defined by the longitudinal distance from the end cutting edges 22', 22" to the rear ends of the peripheral cutting edges 26', 26".

Each cutting tooth 16', 16" may define a helical cutting edge of the end mill 10. Each cutting edge of the end mill 10 may be defined by end cutting edges 22', 22", the chamfer cutting edges 24', 24", and the peripheral cutting edges 26', 26". The cutting diameter D may be defined by the pair of opposed cutting edges.

The end mill 10 may be clamped into a corresponding machine tool by the shank end 12 in a known manner. The shank end 12 may be round and held in place by friction or may have a Weldon Flat for receiving a set screw. After the end mill 10 is connected to the machine tool, a workpiece may be cut in a milling process. The end mill 10 may rotate counterclockwise when viewed from the cutting end 14. However, an end mill configured for clockwise rotation is also contemplated.

Figure 12:
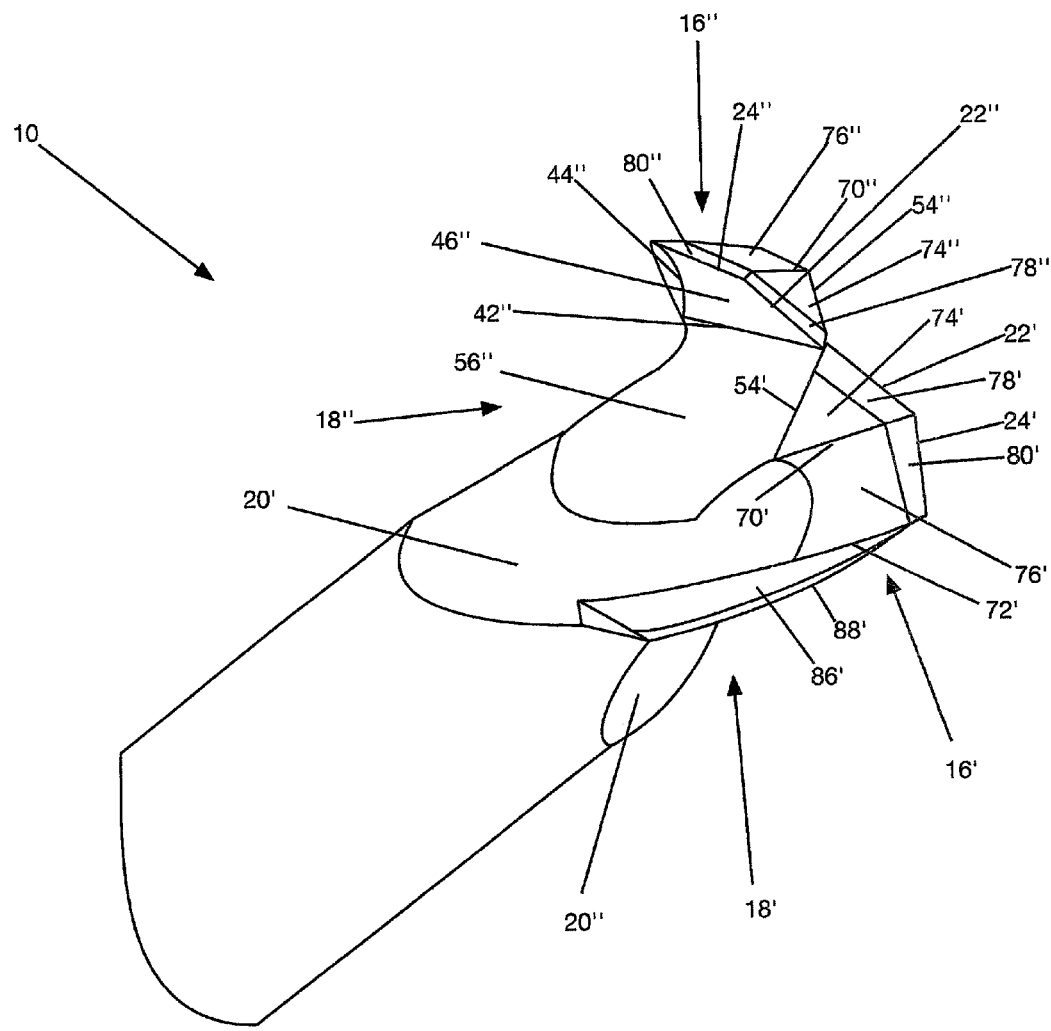
FIG. 12 is a rotated side elevational view of the disclosed end mill.
Figure 13:
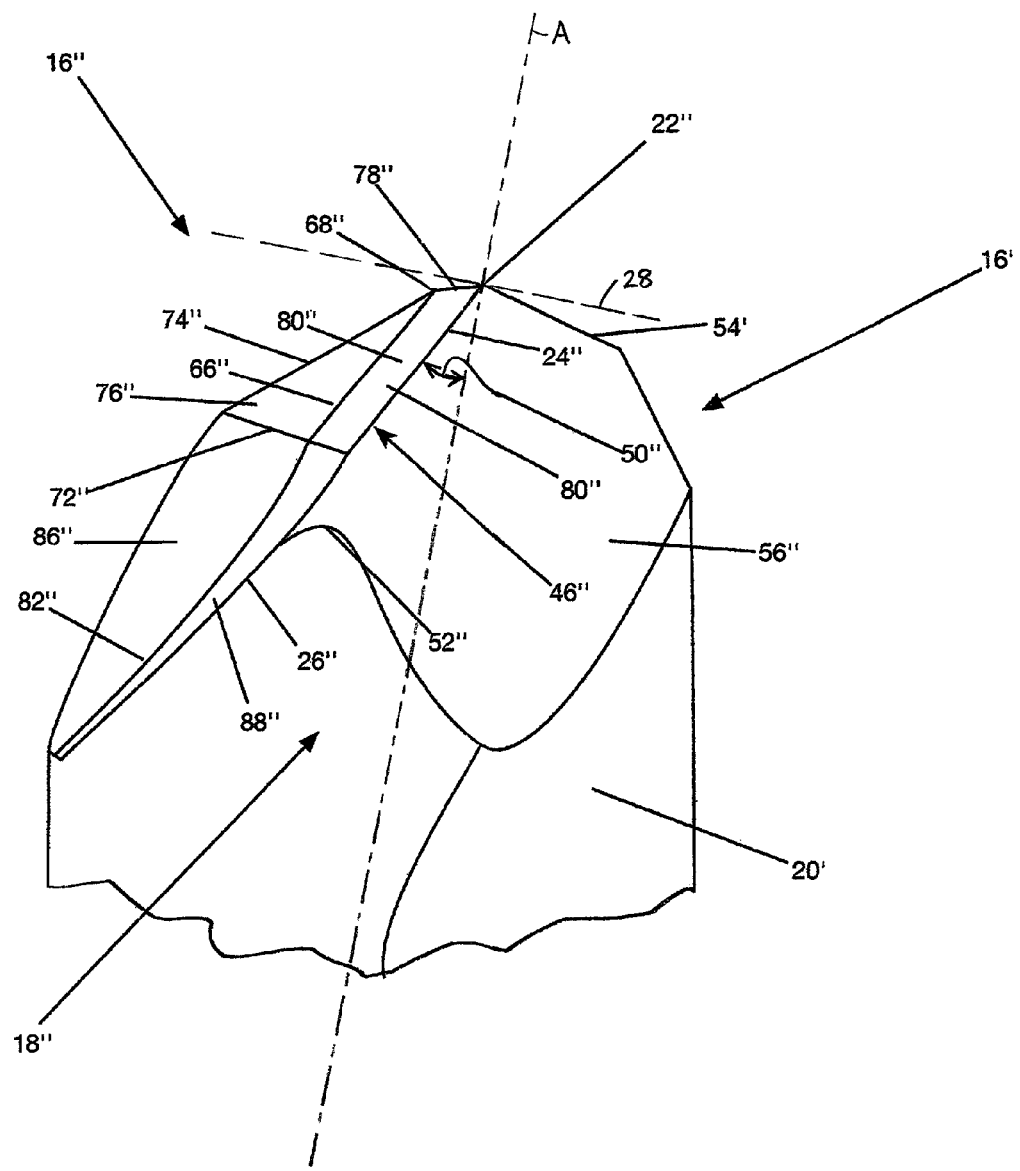
FIG. 13 is another rotated side elevational view of the disclosed end mill.
Figure 14:
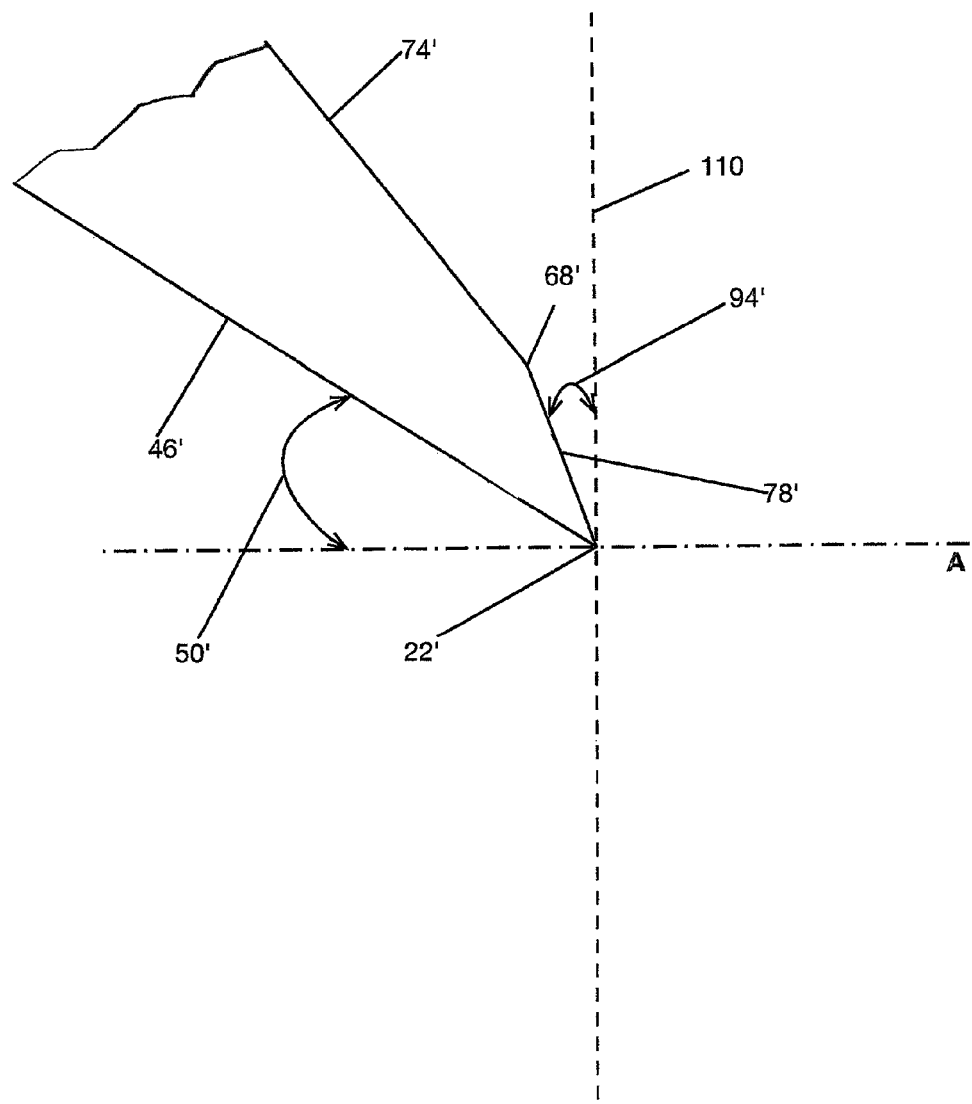
FIG. 14 is a side elevational view of a tooth of the disclosed end mill showing an end cutting edge of the tooth.
Figure 15:
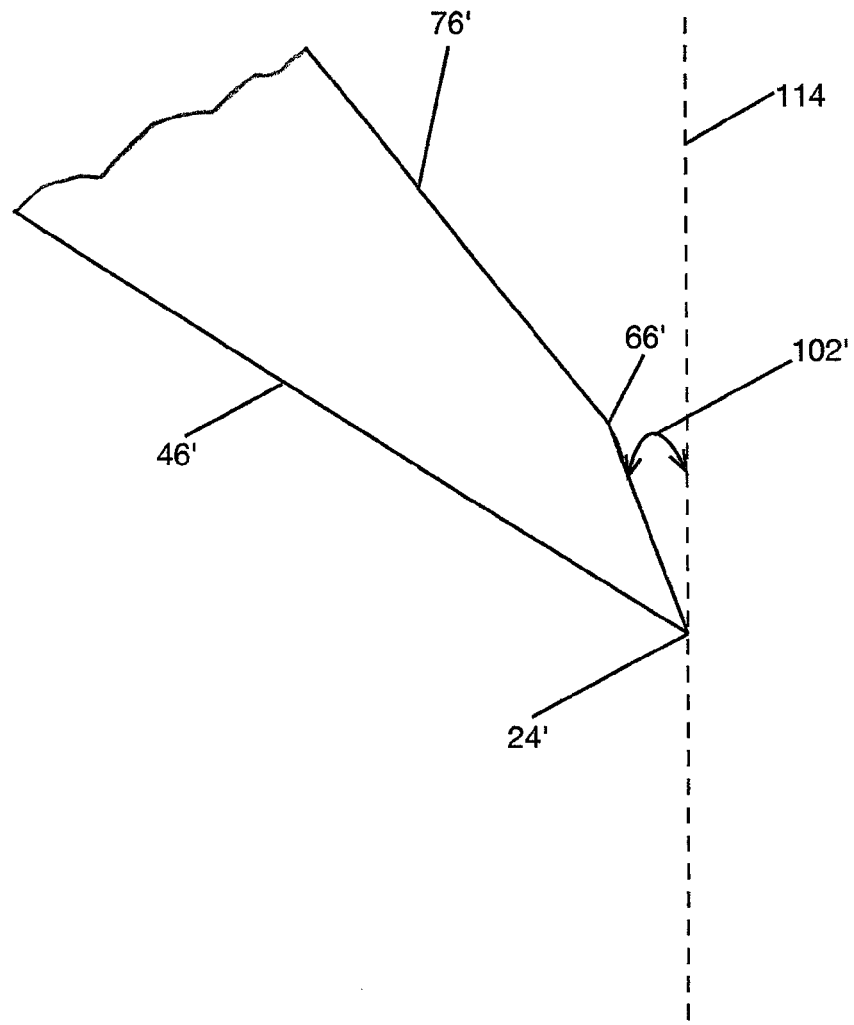
FIG. 15 is an axial perspective view of the tooth of FIG. 14 showing a chamfer cutting edge of the tooth.

Referring generally to FIGS. 3-17, the end mill 10 is oriented in various positions for clarity of the disclosure. FIGS. 3, 4, 6-11, 16 and 17 depict the end mill 10 oriented such that the axis of rotation A is horizontal and the end cutting edges 22 are vertical when viewed from the cutting end 14 along the axis of rotation A. FIGS. 5 and 12 depict the end mill 10 oriented such that the end cutting edges 22', 22" are about 45° from vertical when viewed from the cutting end 14 along the axis of rotation A. FIGS. 13-15 depict the end mill 10 oriented such that the end cutting edges 22', 22" are generally horizontal when viewed from the cutting end 14 along the axis of rotation A.

Figure 4:
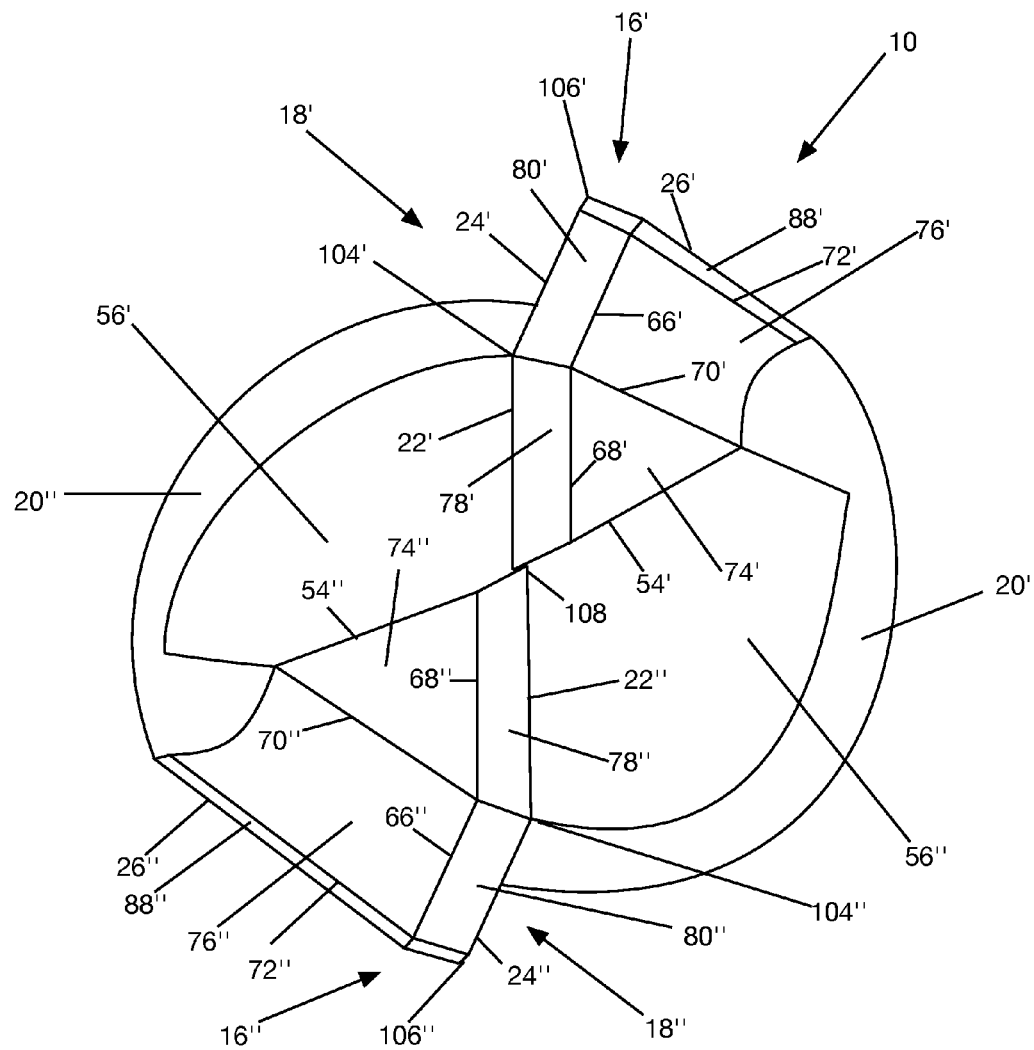
FIG. 4 is front elevational view of the disclosed end mill of FIG. 3.
Figure 5:
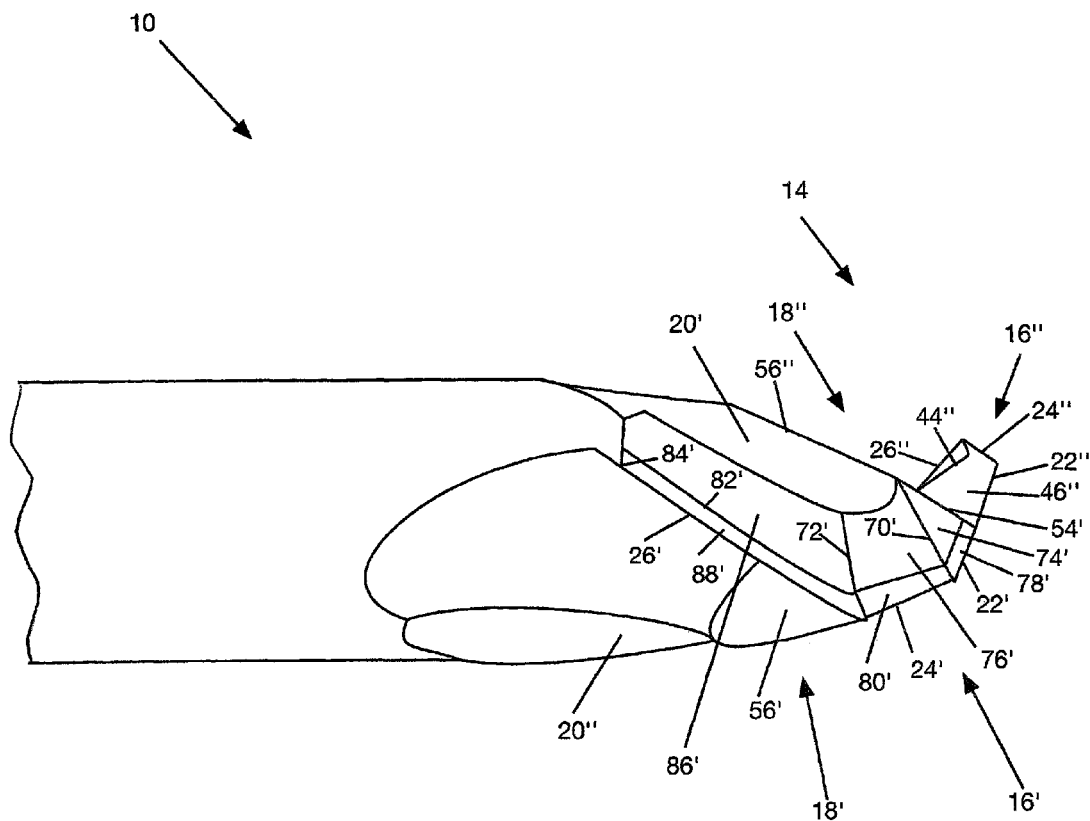
FIG. 5 is a rotated side elevational view of the disclosed end mill.

Referring to FIG. 4, the first end cutting edge 22' of the first tooth 16' may be separated from the second end cutting edge 22" of the second tooth 16" by a web 108. The web 108 may be defined by an area between the first cutting edge 22' and the second cutting edge 22". Each end cutting edge 22', 22" may extend radially outward from the web 108 to a corresponding chamfer cutting edge 24', 24". Each of the end cutting edges 22', 22" may be a linear, straight edge.

Each chamfer cutting edge 24', 24" may extend from a corresponding end cutting edge 22', 22" to a corresponding peripheral cutting edge 26', 26". Each of the chamfer cutting edges 24', 24" may be a linear, straight edge.

Each peripheral cutting edge 26', 26" may extend from a corresponding chamfer cutting edge 24', 24" to the body 11. Each of the peripheral cutting edges 26', 26" may be a curved edge.

Referring still to FIG. 4, the first end cutting edge 22' of the first cutting tooth 16' and the first chamfer cutting edge 24' of the first cutting tooth 16' may form a first corner 104' of the first tooth 16'. The first corner 104' of the first tooth 16' may have a first tooth first radius (not conducive to being shown in the drawings due to the relatively small size of the radius). In one implementation, the first tooth first radius may be between about 0.03 and about 0.06 inches. In another implementation, the first tooth first radius may be between about 0.04 and about 0.05 inches.

Similarly, the second end cutting edge 22" of the second cutting tooth 16" and the second chamfer cutting edge 24" of the second cutting tooth 16" may form a first corner 104" of the second tooth 16". The first corner 104" of the second tooth 16" may have a second tooth first radius (not conducive to being shown in the drawings due to the relatively small size of the radius). In one implementation, the second tooth first radius may be between about 0.03 and about 0.06 inches. In another implementation, the second tooth first radius may be between about 0.04 and about 0.05 inches. In still another implementation, the second tooth first radius may be substantially equal to the first tooth first radius.

Further, the first chamfer cutting edge 24' of the first cutting tooth 16' and the first peripheral cutting edge 26' of the first cutting tooth 16' may form a second corner 106' of the first tooth 16'. The second corner 106' of the first tooth 16' may have a first tooth second radius (not conducive to being shown in the drawings due to the relatively small size of the radius). In one implementation, the first tooth second radius may be between about 0.03 and about 0.06 inches. In another implementation, the first tooth second radius may be between about 0.04 and about 0.05 inches.

Similarly, the second chamfer cutting edge 24" of the second cutting tooth 16" and the second peripheral cutting edge 26" of the second cutting tooth 16" may form a second corner 106" of the second tooth 16". The second corner 106" of the second tooth 16" may have a second tooth second radius (not conducive to being shown in the drawings due to the relatively small size of the radius). In one implementation, the second tooth second radius may be between about 0.03 and about 0.06 inches. In another implementation, the second tooth second radius may be between about 0.04 and about 0.05 inches. In still another implementation, the second tooth second radius may be substantially equivalent to the first tooth first radius.

Figure 6:
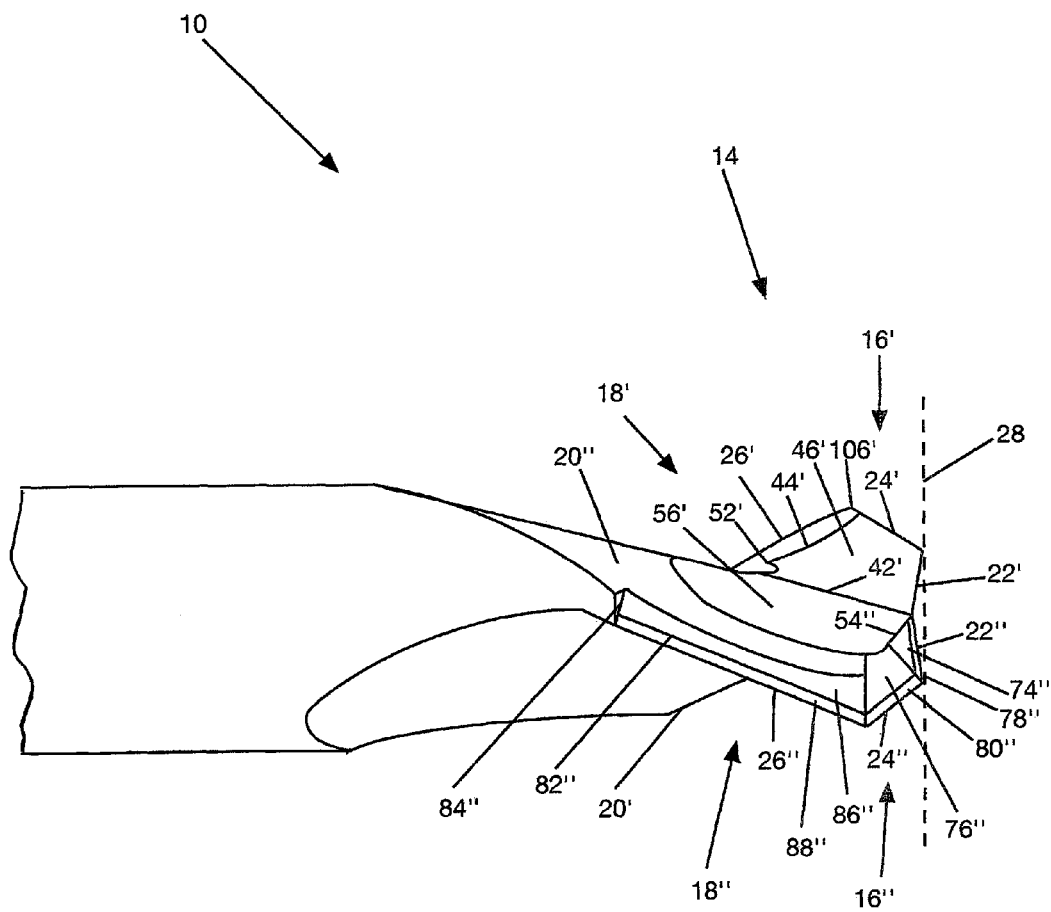
FIG. 6 is an enlarged view of the disclosed end mill of FIG. 3.

Referring to FIG. 6, a plurality of virtual cross planes may extend the length L of the body 11, where each of the plurality of virtual cross planes may be perpendicular to the axis of rotation A. A forward most point of each of the end cutting edges 22', 22" may lie in a particular virtual cross plane 28 that is substantially perpendicular to the axis of rotation A proximate the cutting end 14.

Figure 7:
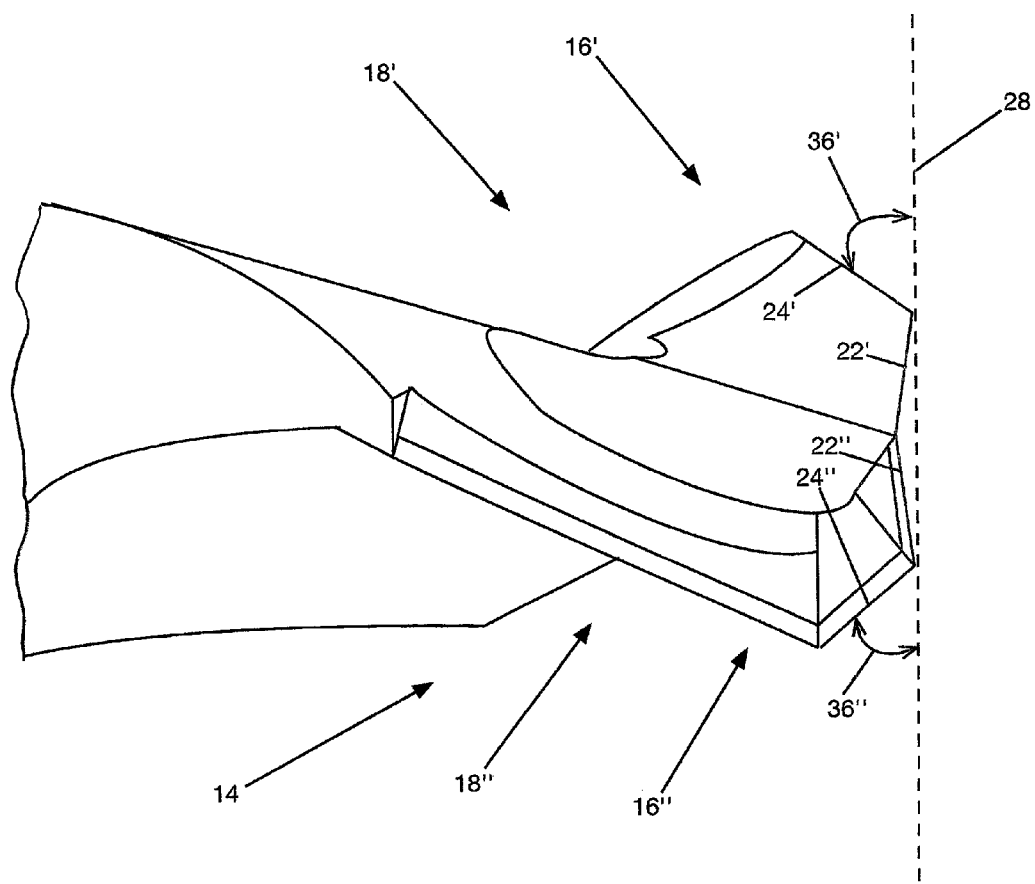
FIG. 7 is an enlarged view of a cutting end of the disclosed end mill of FIG. 6.

Referring to FIG. 7, the first chamfer cutting edge 24' of the first cutting tooth 16' may extend at a first chamfer angle 36' relative to the virtual cross plane 28. In one implementation, the first chamfer angle 36' may be between about 40 and about 60 degrees. In another implementation, the first chamfer angle 36' may be between about 40 and about 50 degrees. In another implementation, the first chamfer angle 36' may be between about 40 and about 45 degrees. In yet another implementation, the first chamfer angle 36' may be about 45 degrees.

Similarly, the second chamfer cutting edge 24" of the second cutting tooth 16" may extend at a second chamfer angle 36" relative to the virtual cross plane 28. In one implementation, the second chamfer angle 36" may be between about 40 and about 60 degrees. In another implementation, the second chamfer angle 36" may be between about 40 and about 50 degrees. In another implementation, the second chamfer angle 36" may be between about 40 and about 45 degrees. In yet another implementation, the second chamfer angle 36" may be about 45 degrees. In still another implementation, the second chamfer angle 36" may be substantially equal to the first chamfer angle 36'.

Figure 8:
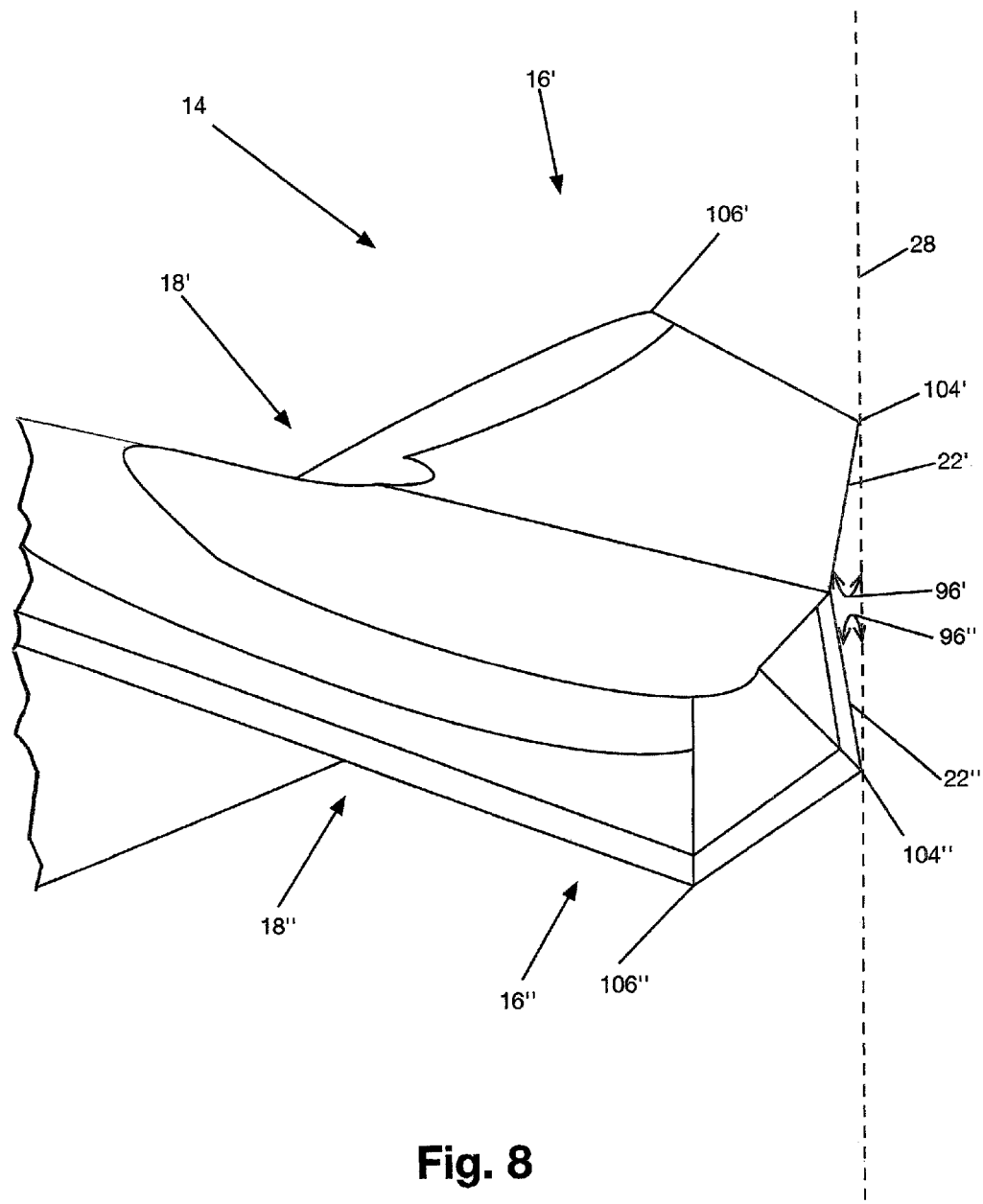
FIG. 8 is an enlarged view of the cutting end of FIG. 7.

Referring to FIG. 8, the first end cutting end 22' may be disposed at a first dish angle 96' relative to the virtual cross plane 28. The first dish angle 96' may be a true angle between the first cutting end 22' and the virtual cross plane 28 measured in a view where the first cutting end 22' is seen as a line of true length and the virtual cross plane 28 appears as a line or edge. In one implementation the first dish angle 96' may be between about 2 and about 3 degrees. In another implementation, the first dish angle 96' may be about 2.5 degrees. "True angle," as used herein, may be between two lines, a line and a plane, or two planes. The true angle between any two lines is measured in a view where both lines are true length. The true angle between a line and a plane is measured in a view where the plane appears as a line or an edge and the line is true length. The true angle between two planes is measured in a view where both planes appear as lines. As used herein, a line is "true length" when viewed in a direction perpendicular to that line.

Similarly, the second end cutting end 22" may be disposed at a second dish angle 96" relative to the virtual cross plane 28. The second dish angle 96" may be a true angle between the second cutting end 22" and the virtual cross plane 28 measured in a view where the second cutting end 22" is seen as a line of true length and the virtual cross plane 28 appears as a line or edge. In one implementation the second dish angle 96" may be between about 2 and about 3 degrees. In another implementation, the second dish angle 96" may be about 2.5 degrees. In still another implementation, the second dish angle 96" may be substantially equal to the first dish angle 96'.

Figure 16:
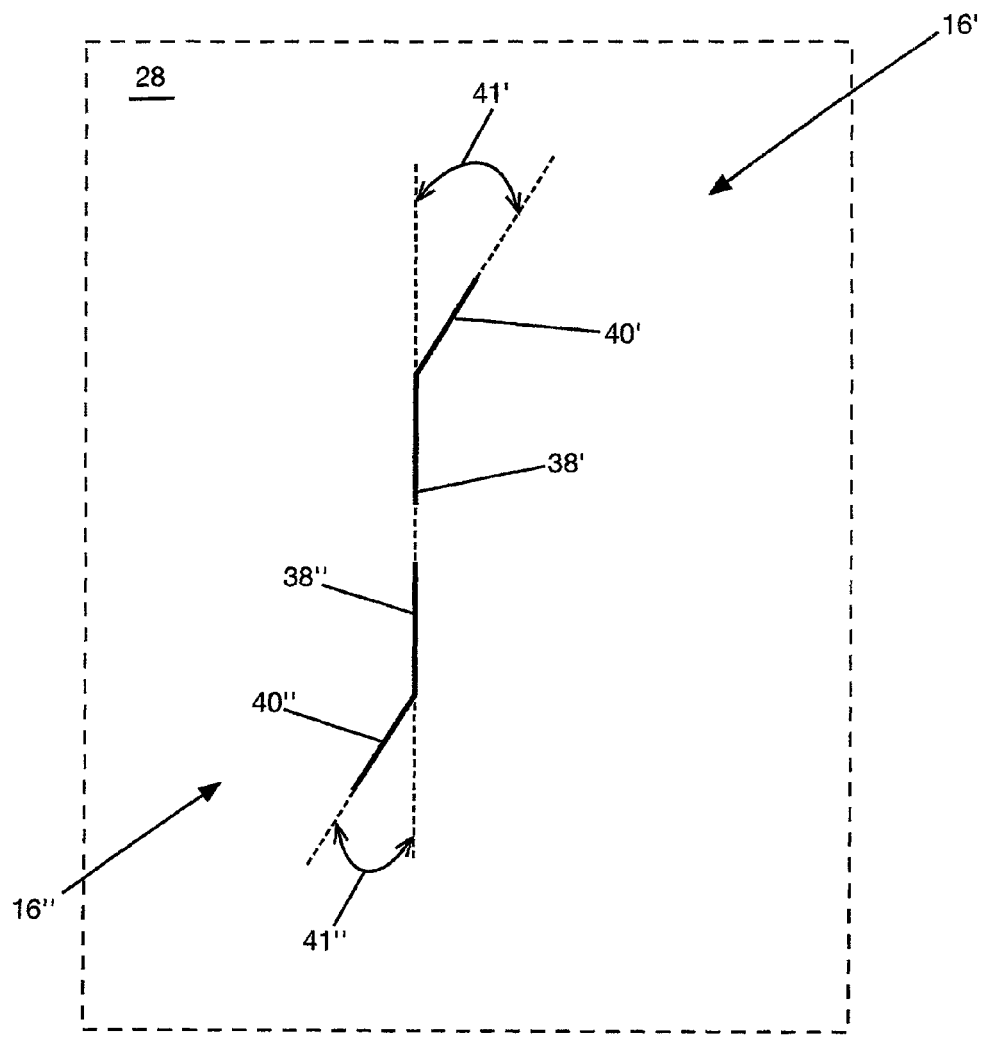
FIG. 16 is a schematic end elevational view showing a radial chamfer-edge-to-end-edge angle projected onto a virtual cross plane.

Referring to FIG. 16, an orthogonal projection 38' of the first end cutting edge 22' of the first cutting tooth 16' onto the virtual cross plane 28 may form a first projected line segment of the first cutting tooth 16'. An orthogonal projection 40' of the first chamfer cutting edge 24' of the first cutting tooth 16' onto the virtual cross plane 28 may form a second projected line segment of the first cutting tooth 16'. The orthogonal projection 38' of the first end cutting edge 22' may be disposed at a first radial chamfer-edge-to-end-edge angle 41' relative to the orthogonal projection 40' of the first chamfer cutting edge 24'.

In one implementation, the first radial chamfer-edge-to-end-edge angle 41' may be between about 10 and about 13 degrees. In another implementation, the first radial chamfer-edge-to-end-edge angle 41' may be between about 11 and about 12 degrees. In yet another implementation, the first radial chamfer-edge-to-end-edge angle 41' may be about 11.8 degrees.

Similarly, an orthogonal projection 38" of the second end cutting edge 22" of the second cutting tooth 16" onto the virtual cross plane 28 may form a first projected line segment of the second cutting tooth 16". An orthogonal projection 40" of the second chamfer cutting edge 24" of the second cutting tooth 16" onto the virtual cross plane 28 may form a second projected segment of the second cutting tooth 16". The orthogonal projection 38" of the second end cutting edge 22" may be disposed at a second radial chamfer-edge-to-end-edge angle 41" relative to the orthogonal projection 40" of the second chamfer cutting edge 24".

In one implementation, the second radial chamfer-edge-to-end-edge angle 41" may be between about 10 and about 13 degrees. In another implementation, the second radial chamfer-edge-to-end-edge angle 41" may be between about 11 and about 12 degrees. In yet another implementation, the second radial chamfer-edge-to-end-edge angle 41" may be about 11.8 degrees. In still another implementation, the second radial chamfer-edge-to-end-edge angle 41" may be substantially equal to the first radial chamfer-edge-to-end-edge angle 41'.

Figure 9:
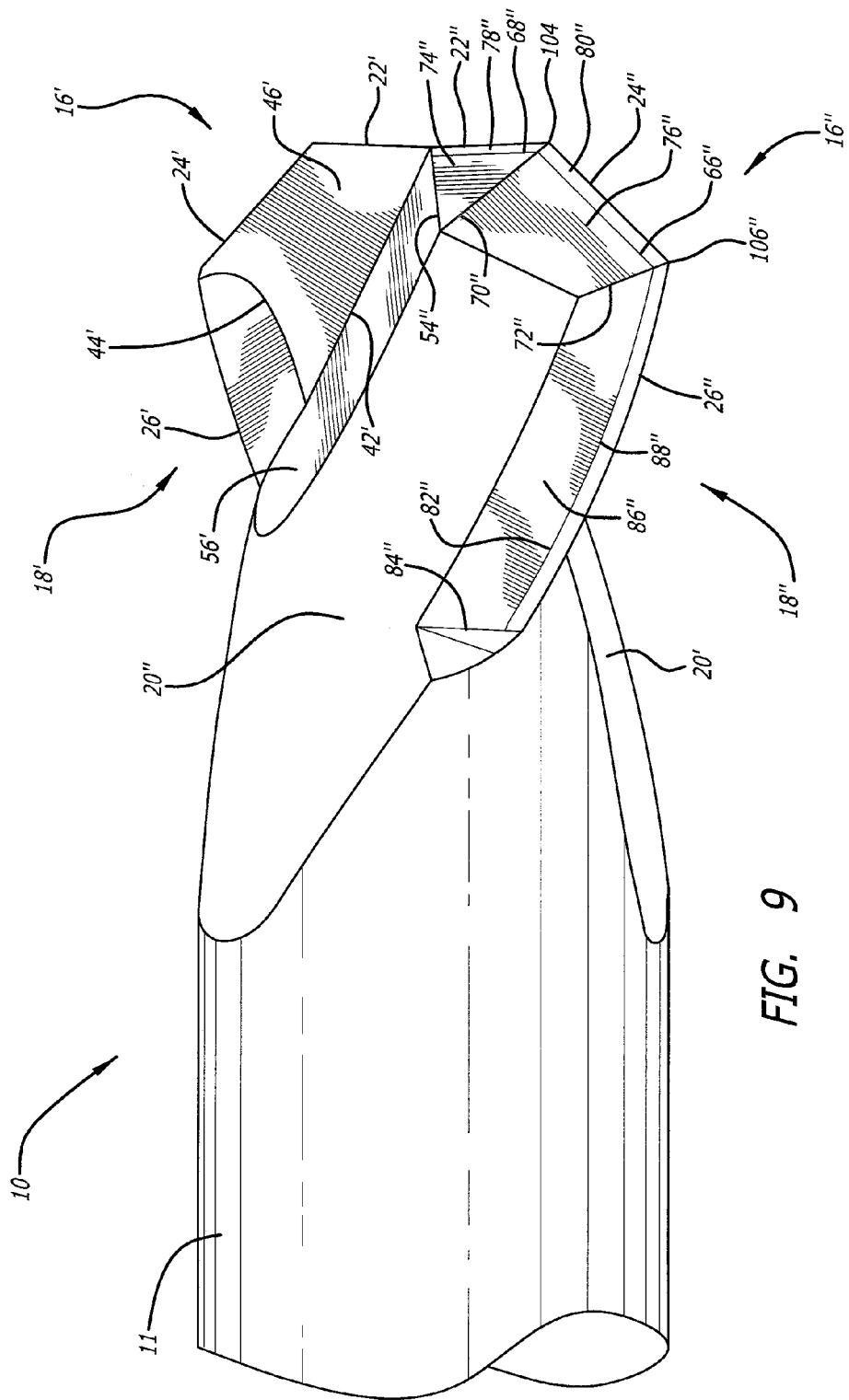
FIG. 9 is another side elevational view of the disclosed end mill.

Referring to FIGS. 6 and 9, the first cutting tooth 16' may include and terminate at a first rake face 46'. The first rake face 46' may be at least partially bounded by the first end cutting edge 22' and the first chamfer cutting edge 24' associated with the first tooth 16'. The first cutting tooth 16' may also include a first notch edge 42' and a first flute edge 44' associated with the first rake face 46'. More particularly, the first rake face 46' may additionally be at least partially bounded by the first notch edge 42' and the first flute edge 44' associated with the first tooth 16'.

Referring to FIGS. 5 and 12, the second cutting tooth 16" may include and terminate at a second rake face 46". The second rake face 46" may be at least partially bounded by the second end cutting edge 22" and the second chamfer cutting edge 24" associated with the second tooth 16". The second cutting tooth 16" may also include a second notch edge 42" and a second flute edge 44" associated with the second rake face 46". More particularly, the second rake face 46" may additionally be at least partially bounded by the second notch edge 42" and the second flute edge 44" associated with the second tooth 16".

Figure 10:
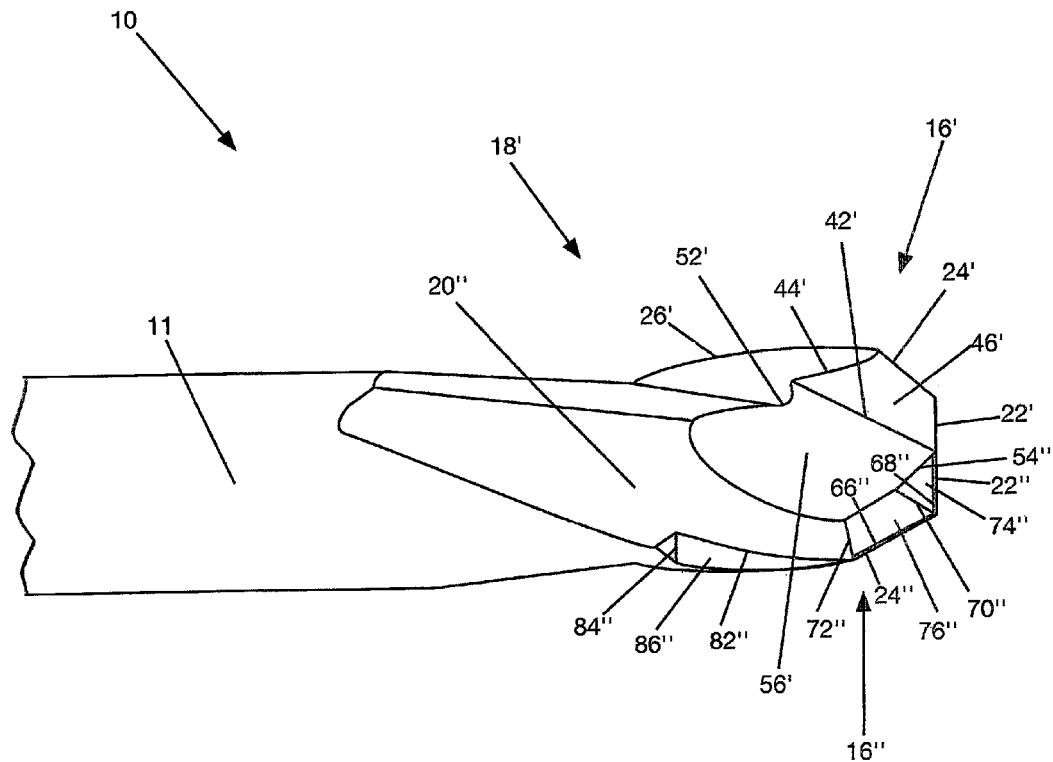
FIG. 10 is another side elevational view of the disclosed end mill.
Figure 11:
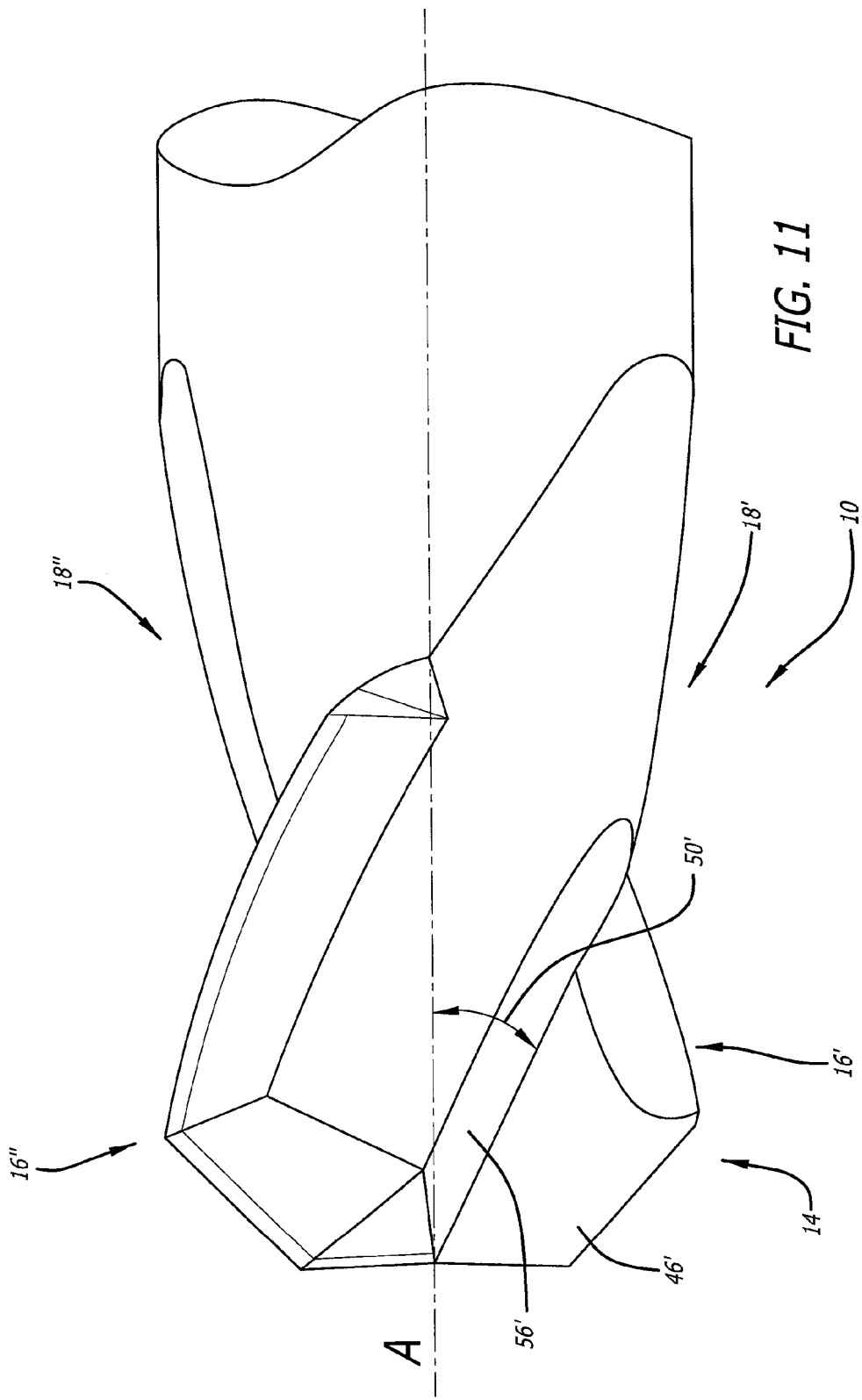
FIG. 11 is an enlarged side elevational view of the disclosed end mill.

Referring to FIGS. 10 and 11, the first rake face 46' may include a substantially planar surface. The first rake face 46' may be disposed at a first rake face angle 50' relative to the axis of rotation A. The first rake face angle 50' may be a true angle measured between the first rake face 46' and the axis of rotation A. In one implementation, the first rake angle 50' may be between about 16 and about 20 degrees.

Referring to FIG. 13, the second rake face 46" may include a substantially planar surface. The second rake face 46" may be disposed at a second rake face angle 50" relative to the axis of rotation A. The second rake face angle 50" may be a true angle measured between the second rake face 46" and the axis of rotation A. In one implementation, the second rake angle 50" may be between about 16 and about 20 degrees. In yet another implementation, the second rake face angle 50" may be substantially equal to the first rake face angle 50'.

Referring to FIGS. 10 and 13, the first cutting tooth 16' may include a first hook 52' and the second cutting tooth 16" may include a second hook 52". The first hook 52' and the second hook 52" may refer to a concave condition of a face of the corresponding first tooth 16' and second tooth 16" formed by a curved surface measured at the cutting edge. On one implementation, each hook 52', 52" may include a radius of between about 0.1 and 0.2 inches. In another implementation, each hook 52', 52" may include a radius of about 0.12 inches.

Referring again to FIGS. 9 and 12, the first cutting tooth 16' may further include a first gash face 56' and a first gash edge 54'. The second cutting tooth 16" may further include a second gash face 56" and a second gash edge 54". The first gash face 56' and the second gash face 54" may include a contoured surface (e.g., a curved surface) or may include a planar surface. The width of the gash face 56', 56" may define the space between cutting edges of the cutting teeth 16', 16".

The first gash face 56' may be at least partially bounded by the first notch edge 42' associated with the first cutting tooth 16' and the second gash edge 54" associated with the second cutting tooth 16". Similarly, the second gash face 56" may be at least partially bounded by the second notch edge 42" associated with the second cutting tooth 16" and the first gash edge 54' associated with the first cutting tooth 16'.

Figure 17:
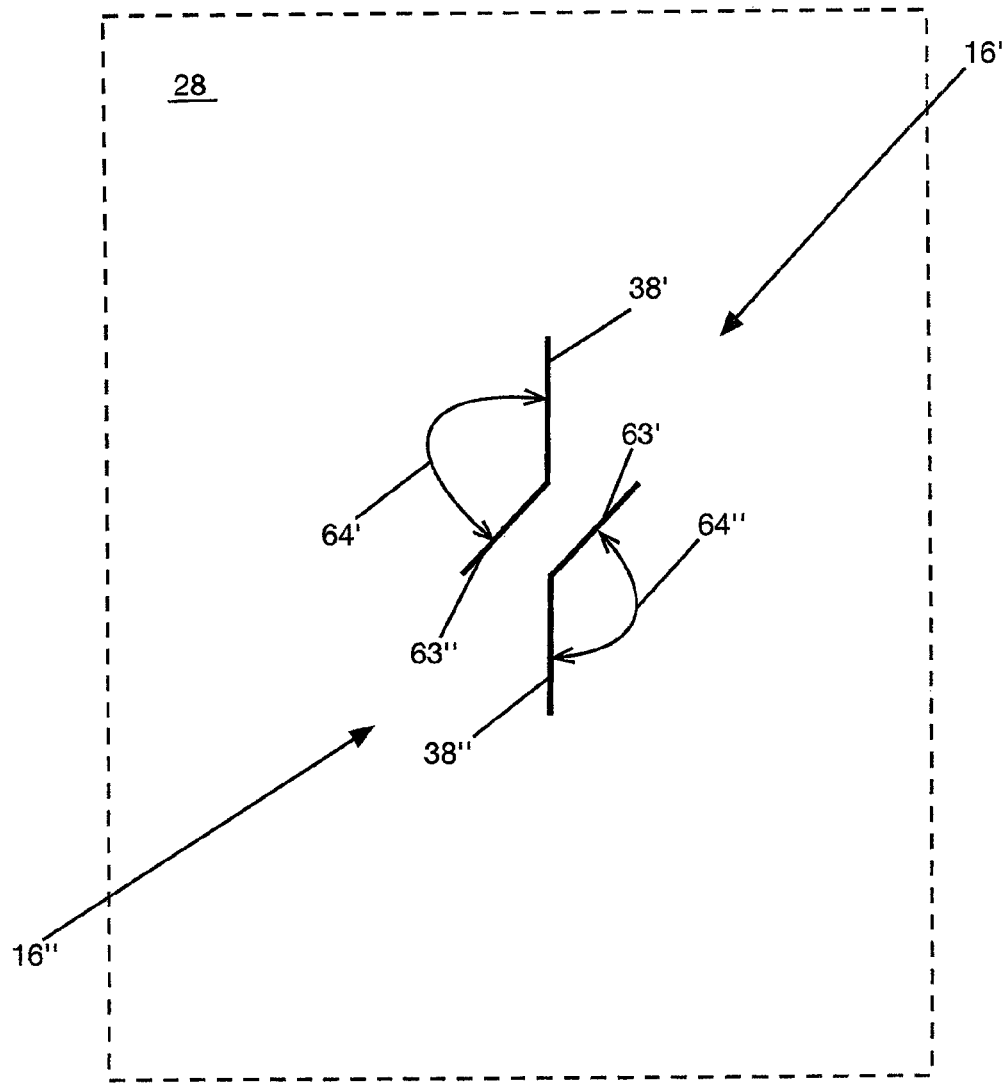
FIG. 17 is a schematic end elevational view showing a gash angle projected onto a virtual cross plane.

Referring to FIG. 17, an orthogonal projection 63' of the first gash edge 54' onto the virtual cross plane 28 may form a third projected segment of the first cutting tooth 16'. An orthogonal projection 63" of the second gash edge 54" onto the virtual cross plane 28 may form a third projected segment of the second cutting tooth 16".

The orthogonal projection 63" of the second gash edge 54" may be disposed at a first gash angle 64' relative to the orthogonal projection 38' of the first end cutting edge 22' of the first cutting tooth 16'. In one implementation, the first gash angle 64' may be between about 105 and about 115 degrees. In another implementation, the first gash angle 64' may be between about 106 and about 110 degrees. In another implementation, the first gash angle 64' may be between about 107 degrees.

Similarly, the orthogonal projection 63' of the first gash edge 54' may be disposed at a second gash angle 64" relative to the orthogonal projection 38" of the second end cutting edge 22" of the second cutting tooth 16". In one implementation, the second gash angle 64" may be between about 105 and about 115 degrees. In another implementation, the second gash angle 64" may be between about 106 and about 110 degrees. In another implementation, the second gash angle 64" may be about 107 degrees. In yet another implementation, the second gash angle 64" may be substantially equal to the first gash angle 64'.

Referring to FIGS. 4 and 5, the first cutting tooth 16' may include a first end trailing edge 68'. The end trailing edge 68' may be generally parallel with and spaced a first distance from a corresponding first end cutting edge 22' of the first cutting tooth 16'. The first end trailing edge 68' and the first end cutting edge 22' may at least partially define a first end margin 78'. The first end margin 78' may include a substantially planar surface. In one implementation, the first distance between the first end trailing edge 68' and the first end cutting edge 22' may be between about 0.02 and about 0.05 inches. In another implementation, the first distance between the first end trailing edge 68' and the first end cutting edge 22' may be about 0.035 inches.

The first end margin 78' of the first cutting tooth 16' may transition to a first end heel 74' proximate the first end trailing edge 68'. The first end heel 74' may be at least partially bounded by the first end trailing edge 68', the first gash edge 54', and a first end heel separation edge 70'. The first end heel 74' may extent to proximate the second gash face 56" associated with the second cutting tooth 16". The first end margin 78' may additionally be at least partially bounded by the first gash edge 54' and the first end heel separation edge 70'.

The first cutting tooth 16' may include a first chamfer trailing edge 66'. The first chamfer trailing edge 66' may be generally parallel with and spaced a first distance from a corresponding first chamfer cutting edge 22' of the first cutting tooth 16'. The first chamfer trailing edge 66' and the first chamfer cutting edge 24' may at least partially define a first chamfer margin 80'. The first chamfer margin 80' may include a substantially planar surface. In one implementation, the first distance between the first chamfer trailing edge 66' and the first chamfer cutting edge 24' may be between about 0.02 and about 0.05 inches. In another implementation, the first distance between the first chamfer trailing edge 66' and the first chamfer cutting edge 24' may be about 0.03 inches.

The first chamfer margin 80' of the first cutting tooth 16' may transition to a first chamfer heel 76' proximate the first chamfer trailing edge 66'. The first chamfer heel 76' may be at least partially bounded by the first chamfer trailing edge 66', the first end heel separation edge 70', and a first chamfer heel separation edge 72'. The first chamfer heel 76' may extent to proximate the second gash face 56" associated with the second cutting tooth 16" and the first helical surface 20' associated with the first cutting tooth 16'. The first chamfer margin 80' may additionally be at least partially bounded by the first end heel separation edge 70' and the first chamfer heel separation edge 72'.

The first cutting tooth 16' may include a first peripheral trailing edge 82'. The first peripheral trailing edge 82' may be generally parallel with and spaced a first distance from a corresponding first peripheral cutting edge 26' of the first cutting tooth 16'. The first peripheral trailing edge 82' and the first peripheral cutting edge 26' may at least partially define a first peripheral margin 88'. In one implementation, the first distance between the first peripheral trailing edge 82' and the first peripheral cutting edge 26' may be between about 0.02 and about 0.05 inches. In another implementation, the first distance between the first peripheral trailing edge 82' and the first peripheral cutting edge 26' may be about 0.035 inches.

The first peripheral margin 88' of the first cutting tooth 16' may transition to the first peripheral heel 86' proximate the first peripheral trailing edge 82'. The first peripheral heel 86' may be at least partially bounded by the first peripheral trailing edge 82', the first chafer heel separation edge 72', and a first peripheral heel separation edge 84'. The first peripheral heel 86' may extent to proximate the first helical surface 20' associated with the first cutting tooth 16'. The first peripheral margin 86' may additionally be at least partially bounded by the first chamfer heel separation edge 72' and the first peripheral heel separation edge 84'.

Referring to FIGS. 4 and 6, the second cutting tooth 16" may include a second end trailing edge 68". The second end trailing edge 68" may be generally parallel with and spaced a second distance from a corresponding second end cutting edge 22" of the second cutting tooth 16". The second end trailing edge 68" and the second end cutting edge 22" may at least partially define a second end margin 78". The second margin 78" may include a substantially planar surface. In one implementation, the second distance between the second end trailing edge 68" and the second end cutting edge 22" may be between about 0.02 and about 0.05 inches. In another implementation, the second distance between the second end trailing edge 68" and the second end cutting edge 22" may be about 0.025 inches. In yet another implementation, the second distance between the second end trailing edge 68" and the second end cutting edge 22" may be substantially equal to the first distance between the first end trailing edge 68' and the first end cutting edge 22'.

The second end margin 78" of the second cutting tooth 16" may transition to a second end heel 74" proximate the second end trailing edge 68". The second end heel 74" may be at least partially bounded by the second end trailing edge 68", the second gash edge 54", and a second end heel separation edge 70". The second end heel 74" may extent to proximate the first gash face 56' associated with the first cutting tooth 16'. The second end margin 78" may additionally be at least partially bounded by the second gash edge 54" and the second end heel separation edge 70".

The second cutting tooth 16" may include a second chamfer trailing edge 66". The second chamfer trailing edge 66" may be generally parallel with and spaced a second distance from a corresponding second chamfer cutting edge 24" of the second cutting tooth 16". The second chamfer trailing edge 66" and the second chamfer cutting edge 24" may at least partially define a second chamfer margin 80". The second chamfer margin 80" may include a substantially planar surface. In one implementation, the second distance between the second chamfer trailing edge 66" and the second chamfer cutting edge 24" may be between about 0.02 and about 0.05 inches. In another implementation, the second distance between the second chamfer trailing edge 66" and the second chamfer cutting edge 24" may be about 0.03 inches. In yet another implementation, the second distance between the second chamfer trailing edge 66" and the second chamfer cutting edge 24" may be substantially equal to the first distance between the first chamfer trailing edge 66' and the first chamfer cutting edge 24'.

The second chamfer margin 80" of the second cutting tooth 16" may transition to a second chamfer heel 76" proximate the second chamfer trailing edge 66". The second chamfer heel 76" may be at least partially bounded by the second chamfer trailing edge 66", the second end heel separation edge 70", and a second chamfer heel separation edge 72". The second chamfer heel 76" may extent to proximate the first gash face 56' associated with the first cutting tooth 16' and the second helical surface 20" associated with the second cutting tooth 16". The second chamfer margin 80" may additionally be at least partially bounded by the second end heel separation edge 70" and the second chamfer heel separation edge 72".

The second cutting tooth 16" may include a second peripheral trailing edge 82". The second peripheral trailing edge 82" may be generally parallel with and spaced a second distance from a corresponding second peripheral cutting edge 26" of the second cutting tooth 16". The second peripheral trailing edge 82" and the second peripheral cutting edge 26" may at least partially define a second peripheral margin 88". In one implementation, the second distance between the second peripheral trailing edge 82" and the second peripheral cutting edge 26" may be between about 0.02 and about 0.05 inches. In another implementation, the second distance between the second peripheral trailing edge 82" and the second peripheral cutting edge 26" may be about 0.025 inches. In yet another implementation, the second distance between the second peripheral trailing edge 82" and the second peripheral cutting edge 26" may be substantially equal to the first distance between the first peripheral trailing edge 82' and the first peripheral cutting edge 26'.

The second peripheral margin 88" of the second cutting tooth 16" may transition to a second peripheral heel 86" proximate the second peripheral trailing edge 82". The second peripheral heel 86" may be at least partially bounded by the second peripheral trailing edge 82", the second chamfer heel separation edge 72", and a second peripheral heel separation edge 84". The second peripheral heel 86" may extent to proximate the second helical surface 20" associated with the second cutting tooth 16". The second peripheral margin 86" may additionally be at least partially bounded by the second chamfer heel separation edge 72" and the second peripheral heel separation edge 84".

Referring to FIG. 14, as illustrated with the axis of rotation A and the first end cutting edge 22' oriented horizontally, the first end cutting edge 22' may be contained in a virtual vertical plane 110. The first end margin 78' may be disposed at a first end primary relief angle 94' relative to the virtual vertical plane 110. In one implementation, the first end primary relief angle 94' may be between about 20 and about 25 degrees.

It can be appreciated that FIG. 14 illustrates the first cutting tooth 16', which equally represents the second cutting tooth 16". As such, the first end cutting edge 22' equally represents the second end cutting edge 22" (FIG. 4); the first end margin 78' equally represents the second end margin 78" (FIG. 4); the first end trailing edge 68' equally represents the second end trailing edge 68" (FIG. 4); the first end heel 74' equally represents the second end heel 74" (FIG. 4); and the first rake face 46' equally represents the second rake face 46" (FIG. 12). Further, the first end primary relief angle 94' equally represents a second end primary relief angle (not shown).

Thus, with the axis of rotation A and the second end cutting edge 22" oriented horizontally, the second end cutting edge 22" may be contained in the virtual vertical plane 110. The second end margin 78" may be disposed at the second end primary relief angle relative to the virtual vertical plane 110. In one implementation, the second end primary relief angle may be between about 20 and about 25 degrees. In yet another implementation, the second end primary relief angle may be substantially equal to the first end primary relief angle 94'.

Referring to FIG. 15, as illustrated with the axis of rotation A and the first chamfer cutting edge 24' oriented horizontally, the first chamfer cutting edge 24' may be contained in a virtual vertical plane 114. The first chamfer margin 80' may be disposed at a first chamfer primary relief angle 102' relative to the virtual vertical plane 114. In one implementation, the first chamfer primary relief angle 102' may be between about 20 and about 25 degrees.

It can be appreciated that FIG. 15 illustrates the first cutting tooth 16', which equally represents the second cutting tooth 16". As such, the first chamfer cutting edge 24' equally represents the second chamfer cutting edge 24" (FIG. 4); the first chamfer margin 80' equally represents the second chamfer margin 80" (FIG. 4); the first chamfer trailing edge 66' equally represents the second chamfer trailing edge 66" (FIG. 4); the first chamfer heel 76' equally represents the second chamfer heel 76" (FIG. 4); and the first rake face 46' equally represents the second rake face 46" (FIG. 12). Further, the first chamfer primary relief angle 102' equally represents a second chamfer primary relief angle (not shown).

Thus, with the axis of rotation A and the second chamfer cutting edge 24" oriented horizontally, the second chamfer cutting edge 24" may be contained in the virtual vertical plane 114. The second chamfer margin 80" may be disposed at the second chamfer primary relief angle relative to the virtual vertical plane 114. In one implementation, the second chamfer primary relief angle may be between about 20 and about 25 degrees. In another implementation, the second chamfer primary relief angle may be substantially equal to the first chamfer primary relief angle 102'.

It is believed that the disclosed end mill 10 may provide particular benefits, including lowering irritation noise produced by a radius cutter machine during cutting and milling processes. For example, during surface profiling operations in an aluminum shim machine.

The disclosed end mill 10 may significantly reduce the noise intensity when used for profiling a shim surface produced by a shim mill machine. Tests were performed using the disclosed end mill 10 with a MAZAK VTC 330C Shim Mill. The disclosed end mill 10 was tested during surface profiling of aluminum 7075 T73 plates having a thickness between about 0.16 ad about 0.25 inches. In one test, the milling machine was set up at a rotational speed of 12,000 revolutions per minute (RPM) and a feed speed of 400 inches per minute (IPM). In another test, the milling machine was set up at a rotational speed of 7,000 RPM and a feed speed of 400 IPM. In another test, the milling machine was set up at a rotational speed of 7,000 RPM and a feed speed of 480 IPM.

Each test, especially at 7000 RPM, resulted in a noticeable reduction in vibration (i.e., tool chatter) and a reduction in noise using the cutter in application. Additionally, the tests resulted in improvements to the shim surface roughness and a reduction of shim tear out. Without being limited to any particular theory, the design of the chamfer cutting edges 24', 24", the end primary relief angles 94', 94", the chamfer primary relief angles 102', 102", and the rake angles 50', 50" produced a reduction in the drag of the cutting edges of the end mill 10, thus reducing the noise induced by the milling operation.

Results of one test showed that the disclosed end mill 10 produced a maximum noise intensity of about 84.3 decibels at a rotational speed of 7,000 RPM and a feed speed of 400 IPM without the characteristic "squealing noise." Therefore, it is contemplated that the disclosed end mill 10 may be employed to achieve a maximum noise intensity below about 90 decibels, such as about 85 decibels or less, 84 decibels or less, 83 decibels or less, 82 decibels or less, 81 decibels or less, or even 80 decibels or less, at a rotational speed between 12,000 and 7,000 RPM and a feed rate of 480 to 400 IPM.

Figure 18:
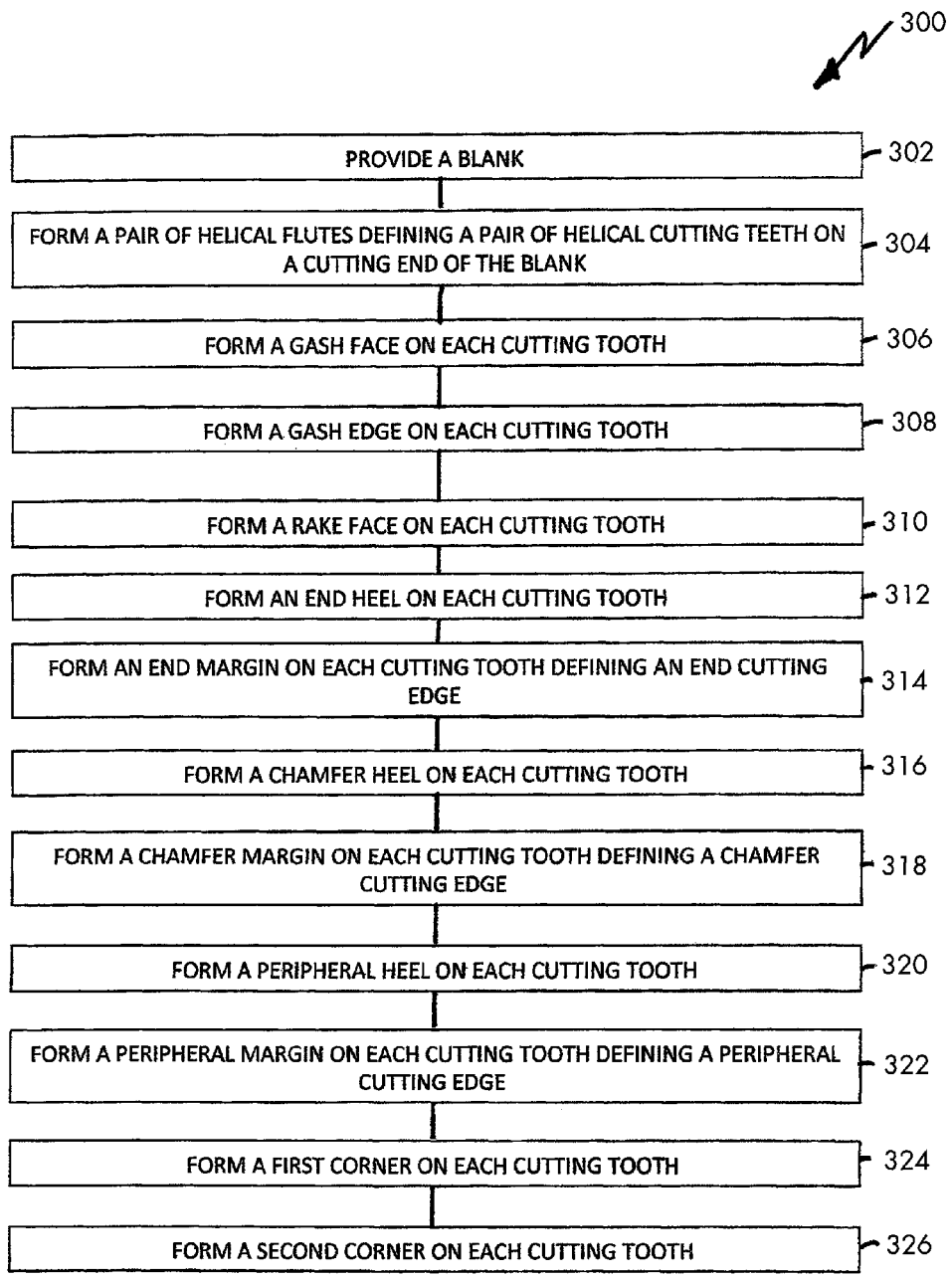
FIG. 18 is a flow chart illustrating one example of the disclosed method for forming an end mill; and It should be appreciated that the drawings are not necessarily true to scale and any represented proportions may be merely approximate.

Referring to FIG. 18, also disclosed is a method, generally designated 300, for forming an end mill. The method 300 may begin at block 302 with the step of providing a cylindrical stock blank having a first end, an opposed second end, and an axis of rotation.

As shown at block 304, a pair of opposing helical flutes may be formed in the first end to define a pair of opposing helical cutting teeth, the helical flutes and helical cutting teeth may define a cutting end of the end mill. The cutting end may have a cutting diameter defined by the pair of cutting teeth.

As shown at block 306, a gash face may be formed on each cutting tooth. As shown at block 308, a gash edge may be formed on each cutting tooth. The gash edge may be formed at a relief angle defined by a gash angle. As shown at block 310, a rake face may be formed on each cutting tooth adjacent to the gash face of an opposing cutting tooth. The rake face may be substantially planar and may be formed at a rake angle relative to the axis of rotation of the blank.

As shown at block 312, an end heel may be formed on each tooth. As shown at block 314, an end margin may be formed on each cutting tooth. Each of the formed end margins may be substantially planar and define a rectilinear end cutting edge and an end trailing edge proximate the end heel. Each end margin may be formed at a primary relief angle adjacent to the end cutting edge. With the axis of rotation and the end cutting edge of each tooth oriented horizontally, the end margin may be formed at the end primary relief angle relative to a virtual vertical plane. Each end cutting edge may be formed at a dish angle relative to a virtual cross plane substantially perpendicular to the axis of rotation of the blank.

As shown at block 316, a chamfer heel may be formed on each cutting tooth adjacent to the end heel of the associated cutting tooth. As shown at block 318, a chamfer margin may be formed on each cutting tooth. Each of the formed chamfer margins may be substantially planar and define a rectilinear chamfer cutting edge and a chamfer trailing edge proximate the chamfer heel. Each chamfer margin may be formed at a primary relief angle adjacent to the chamfer cutting edge. With the axis of rotation and the chamfer cutting edge of each tooth oriented horizontally, the chamfer margin may be formed at the chamfer primary relief angle relative to a virtual vertical plane. The chamfer margin may be formed such that the chamfer cutting edge is formed at a chamfer angle relative to a virtual cross plane perpendicular to the axis of rotation.

As shown at block 320, a peripheral heel may be formed on each cutting tooth adjacent to the chamfer heel of the associated cutting tooth. As shown at block 322, a peripheral margin may be formed on each cutting tooth, where each of the formed peripheral margins define a peripheral cutting edge and a peripheral trailing edge proximate the peripheral heel. The chamfer cutting edge may extend rectilinearly from the end cutting edge to the peripheral cutting edge.

As shown at block 324, a first corner may be formed at an intersection between the end cutting edge and the chamfer cutting edge of each cutting tooth having a first corner radius. As shown at block 326, a second corner may be formed at an intersection between the chamfer cutting edge and the peripheral cutting edge of each cutting tooth having a second corner radius.

Accordingly, the disclosed end mill may be configured to incorporate a cutting end having a pair of cutting teeth including an angled corner chamfer with an increased rake angle and primary relief angle. The design and configuration of the corner chamfer of each cutting tooth along with the increased rake and primary relief angles may reduce contact between the cutting end of the end mill and a work piece, which may result in lowered intensity of noise generated during a cutting and/or milling process, thus reducing the irritation to human hearing. Thus, the disclosed end mill may break up chips, cut or shear metal (e.g., aluminum) with a better surface finish, reduce drag, and lowers noise during shim surface profile machining compared to known corner radius cutters.

Although various aspects of the disclosed end mill have been shown and described, modifications may occur to those skilled in the art upon reading the specification. The present application includes such modifications and is limited only by the scope of the claims.

What is claimed is:

1. An end mill comprising:
   a body elongated along an axis of rotation, the body comprising a shank end and a cutting end opposite the shank end, the cutting end having a cutting diameter and defining a pair of helical flutes that form a first helical cutting tooth and a second helical cutting tooth,
   wherein the first cutting tooth comprises:
      a first peripheral cutting edge;
      a first end cutting edge;
      a first chamfer cutting edge extending from the first peripheral cutting edge to the first end cutting edge, wherein the first chamfer cutting edge extends at a first chamfer angle between about 40 and about 60 degrees relative to a virtual cross plane that is substantially perpendicular to the axis of rotation; and a first rake face at least partially bounded by the first end cutting edge and the first chamfer cutting edge, wherein the first rake face is disposed at a first rake angle relative to the axis of rotation, and wherein the first rake angle is a true angle between about 16 and about 20 degrees; and wherein the second cutting tooth comprises:
a second peripheral cutting edge;
a second end cutting edge;
a second chamfer cutting edge extending from the second peripheral cutting edge to the second end cutting edge, wherein the second chamfer cutting edge extends at a second chamfer angle between about 40 and about 60 degrees relative to the virtual cross plane; and
a second rake face at least partially bounded by the second end cutting edge and the second chamfer cutting edge, wherein the second rake face is disposed at a second rake angle relative to the axis of rotation, and wherein the second rake angle is a true angle between about 16 and about 20 degrees.

2. The end mill of claim 1 wherein the first chamfer angle is about 45 degrees, and wherein the second chamfer angle is about 45 degrees.

3. The end mill of claim 1 wherein an orthogonal projection of the first end cutting edge onto a virtual cross plane that is substantially perpendicular to the axis of rotation is disposed at a first radial chamfer-edge-to-end-edge angle relative to an orthogonal projection of the first chamfer cutting edge onto the virtual cross plane, wherein the first radial chamfer-edge-to-end-edge angle is between about 10 and about 13 degrees.

4. The end mill of claim 1 wherein the first cutting tooth further comprises:
a first notch edge; and
a first flute edge,
wherein the first rake face is at least partially bounded by the first notch edge and the first flute edge; and
wherein the second cutting tooth further comprises:
a second notch edge; and
a second flute edge,
wherein the second rake face is at least partially bounded by the second notch edge and the second flute edge.

5. The end mill of claim 1 wherein the first rake face is substantially planar, and wherein the first rake angle is about 20 degrees.

6. The end mill of claim 5 wherein the second rake face is substantially planar, and therein the second rake angle is about 20 degrees.

7. The end mill of claim 4 wherein the first cutting tooth further comprises a first gash face and a first gash edge and the second cutting tooth further comprises a second gash face and a second gash edge;
wherein the first gash face is at least partially bounded by the second gash edge and the first notch edge; and
wherein the second gash face is at least partially bounded by the first gash edge and the second notch edge.

8. The end mill of claim 7 wherein an orthogonal projection of the first end cutting edge onto a virtual cross plane that is substantially perpendicular to the axis of rotation is disposed at a first gash angle relative to an orthogonal projection of the first gash edge onto the virtual cross plane, wherein the first gash angle is between about 105 to about 115 degrees.

9. The end mill of claim 8 wherein an orthogonal projection of the second end cutting edge onto the virtual cross plane is disposed at a second gash angle relative to an orthogonal projection of the second gash edge onto the virtual cross plane, wherein the second gash angle is between about 105 to about 115 degrees.

10. The end mill of claim 9 wherein the second gash angle is substantially equal to the first gash angle.

11. The end mill of claim 4 wherein the first cutting tooth further comprises a first end trailing edge generally parallel with the first end cutting edge, wherein the first end trailing edge and the first end cutting edge at least partially define a first end margin, which is substantially planar, and the first end trailing edge is spaced a first distance from the first end cutting edge, the first distance being a shortest distance along the first end margin between the first end trailing edge and the first end cutting edge; and
wherein the second cutting tooth further comprises a second end trailing edge generally parallel with the second end cutting edge, wherein the second end trailing edge and the second end cutting edge at least partially define a second end margin, which is substantially planar, and the second end trailing edge is spaced a second distance from the second end cutting edge, the second distance being a shortest distance along the second end margin between the second end trailing edge and the second end cutting edge.

12. The end mill of claim 11 wherein, with the axis of rotation and the first end cutting edge oriented horizontally, a first end primary relief angle between the first end margin and a first virtual vertical plane containing the first end cutting edge is between about 20 and about 25 degrees; and
wherein, with the axis of rotation and the second end cutting edge oriented horizontally, a second end primary relief angle between the second end margin and a second virtual vertical plane containing the second end cutting edge is between about 20 and about 25 degrees.

13. The end mill of claim 11 wherein the first end margin transitions to a first end heel proximate the first end trailing edge; and
wherein the second end margin transitions to a second end heel proximate the second end trailing edge.

14. The end mill of claim 4 wherein the first cutting tooth further comprises a first chamfer trailing edge generally parallel with the first chamfer cutting edge, wherein the first chamfer trailing edge and the first chamfer cutting edge at least partially define a first chamfer margin, which is substantially planar, and the first chamfer trailing edge is spaced a first distance from the first chamfer cutting edge, the first distance being a shortest distance along the first chamfer margin between the first chamfer trailing edge and the first chamfer cutting edge; and
wherein the second cutting tooth further comprises a second chamfer trailing edge generally parallel with the second chamfer cutting edge, wherein the second chamfer trailing edge and the second chamfer cutting edge at least partially define a second chamfer margin, which is substantially planar, and the second chamfer trailing edge is spaced a second distance from the second chamfer cutting edge, the second distance being a shortest distance along the second chamfer margin between the second chamfer trailing edge and the second chamfer cutting edge.

15. The end mill of claim 14 wherein, with the axis of rotation and the first chamfer cutting edge oriented horizontally, a first chamfer primary relief angle between the first chamfer margin and a first virtual vertical plane containing the first chamfer cutting edge is between about 20 and about 25 degrees; and wherein, with the axis of rotation and the second chamfer cutting edge oriented horizontally, a second chamfer primary relief angle between the second chamfer margin and a second virtual vertical plane containing the second chamfer cutting edge is between about 20 and about 25 degrees.

16. The end mill of claim 14 wherein the first chamfer margin transitions to a first chamfer heel proximate the first chamfer trailing edge.

17. The end mill of claim 1 wherein the first end cutting edge is disposed at a first dish angle relative to a virtual cross plane substantially perpendicular to the axis of rotation, and wherein the first dish angle is a true angle between about 2 and about 3 degrees.

18. The end mill of claim 1 wherein the first end cutting edge and the first chamfer cutting edge form a first corner of the first tooth, the first corner of the first tooth having a first tooth first radius between about 0.03 and about 0.06 inches.

19. The end mill of claim 1 wherein the first chamfer cutting edge and the first peripheral cutting edge form a second corner of the first tooth, the second corner of the first tooth having a first tooth second radius between about 0.03 and about 0.06 inches.

20. The end mill of claim 1 wherein the first and the second end cutting edges and the first and the second chamfer cutting edges are configured such that the end mill produces a maximum noise intensity of 84.3 decibels at a rotational speed of 7,000 revolutions per minute and a feed speed of 400 inches per minute.

\* \* \* \* \*